(12) United States Patent
Wong

(10) Patent No.: US 6,558,811 B1
(45) Date of Patent: May 6, 2003

(54) MAGNETIC RECORDING MEDIUM WITH ALUMINUM-CONTAINING INTERMETALLIC NITRIDE SEEDLAYER AND METHOD

(75) Inventor: Bunsen Y. Wong, San Diego, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/576,581

(22) Filed: May 22, 2000

(51) Int. Cl.$^7$ .............................. G11B 5/66; G11B 5/70; C23C 14/32; B05D 5/12; B32B 15/04
(52) U.S. Cl. .................. 428/611; 428/336; 428/900; 428/667; 428/627; 428/694 TS; 427/131; 204/192.1; 204/192.12; 204/192.2
(58) Field of Search .................. 428/336, 900, 428/694 TS, 698, 611, 667, 627; 204/192.1, 192.12, 192.15, 192.2; 427/131

(56) References Cited

U.S. PATENT DOCUMENTS

| | | | | |
|---|---|---|---|---|
| 5,577,021 A | * | 11/1996 | Nakatani et al. | 369/275.2 |
| 5,589,262 A | * | 12/1996 | Kiuchi et al. | 428/336 |
| 5,665,467 A | * | 9/1997 | Nakayama et al. | 428/332 |
| 5,693,426 A | | 12/1997 | Lee et al. | 428/611 |
| 5,851,628 A | * | 12/1998 | Ohkubo et al. | 428/141 |
| 6,128,274 A | * | 10/2000 | Mori et al. | 369/275.5 |
| 6,143,388 A | * | 11/2000 | Bian et al. | 428/65.3 |
| 6,174,582 B1 | * | 1/2001 | Bian et al. | 428/65.3 |
| 6,268,978 B1 | * | 7/2001 | Tani et al. | 360/135 |
| 6,420,058 B1 | * | 7/2002 | Haratani et al. | 428/694 T |

* cited by examiner

Primary Examiner—Holly Rickman
(74) Attorney, Agent, or Firm—David M. Sigmond

(57) ABSTRACT

A magnetic recording medium in which a seedlayer includes an aluminum-containing intermetallic nitride for improved performance.

45 Claims, 4 Drawing Sheets

MAGNETIC RECORDING MEDIUM WITH ALUMINUM-CONTAINING INTERMETALLIC NITRIDE SEEDLAYER AND METHOD

BACKGROUND OF THE INVENTION

Magnetic thin film recording disks are commonly manufactured by a s of sputtering processes in an environment of low pressure inert gases. A disk is commonly comprised of a substrate made of nickel phosphorus (NiP) or ceramic glass, an optional magnetic seedlayer, a non-magnetic underlayer made of either pure chromium (Cr) or a chrome alloy (CrX), covered by a magnetic layer made of a cobalt (Co)-based alloy. A protective layer made of sputtered carbon is typically used on top of the magnetic layer and an organic lubricant may be used on top of the protective layer.

A seedlayer is used, especially on glass substrates, to control the grain size of the layers subsequently deposited on it. The ideal seedlayer helps to increase the signal to carrier noise ratio of the recording medium. In addition, the seedlayer provides a template to improve the film texture, decrease inter-granular coupling and enhance magnetic properties.

SUMMARY OF THE INVENTION

The present invention is directed to the field of magnetic recording media in which a seedlayer includes an aluminum-containing intermetallic nitride for improved performance. Intermetallic alloys are compounds of ordered alloy phases formed between two or more metallic elements where the different atomic species occupy specific sites in the crystal lattice. On a phase diagram an intermetallic alloy appears as an intermediate phase that exists over a narrow range of compositions.

A first aspect of the invention is directed to a magnetic recording medium precursor comprising a substrate and a seedlayer comprising an aluminum-containing intermetallic nitride supported by the substrate. A non-magnetic underlayer may be supported by the seedlayer and a magnetic layer may be supported by the underlayer to create a magnetic recording medium.

Another aspect of the invention is directed to a method for making a magnetic recording medium precursor including depositing a seedlayer, comprising an aluminum-containing intermetallic nitride on a substrate. A non-magnetic underlayer may be deposited over the seedlayer and a magnetic layer may be deposited over the underlayer to create the magnetic recording medium.

The use of an aluminum-containing intermetallic nitride seedlayer provides a buffer layer for the underlayer to grow on. This seedlayer helps refine the underlayer and magnetic layer grain size so to improve the performance of the media. The use of the aluminum-containing intermetallic nitride seedlayer is believed to help develop a favorable in-plane texture in the non-magnetic underlayer and in the magnetic layer itself. The seedlayer is also believed to lead to an increase in the in-plane coercivity and remnant magnetization thus improving the parametric performance of the media.

Deposition of the seedlayer may be accomplished by sputtering. A first sputtering technique reactively sputters an aluminum-containing intermetallic alloy in an atmosphere of argon and nitrogen. The Ar:N atomic ratio can vary widely, such as from about 1:10 to about 1:1. A second sputtering technique uses a sputtering target of a desired intermetallic nitride composition in an atmosphere of argon. The amount of nitrogen in the target will commonly range from about 1 to 50% atomic. Other sputtering gases, such as methane and oxygen, or a combination thereof, may also be used. Other techniques for depositing an aluminum-containing intermetallic nitride as the seedlayer may also be used.

Other features and advantages of the invention will appear from the following description in which the preferred embodiments have been set forth in detail in conjunction with the accompanying drawings.

DESCRIPTION OF THE SPECIFIC EMBODIMENTS

Figure 1:
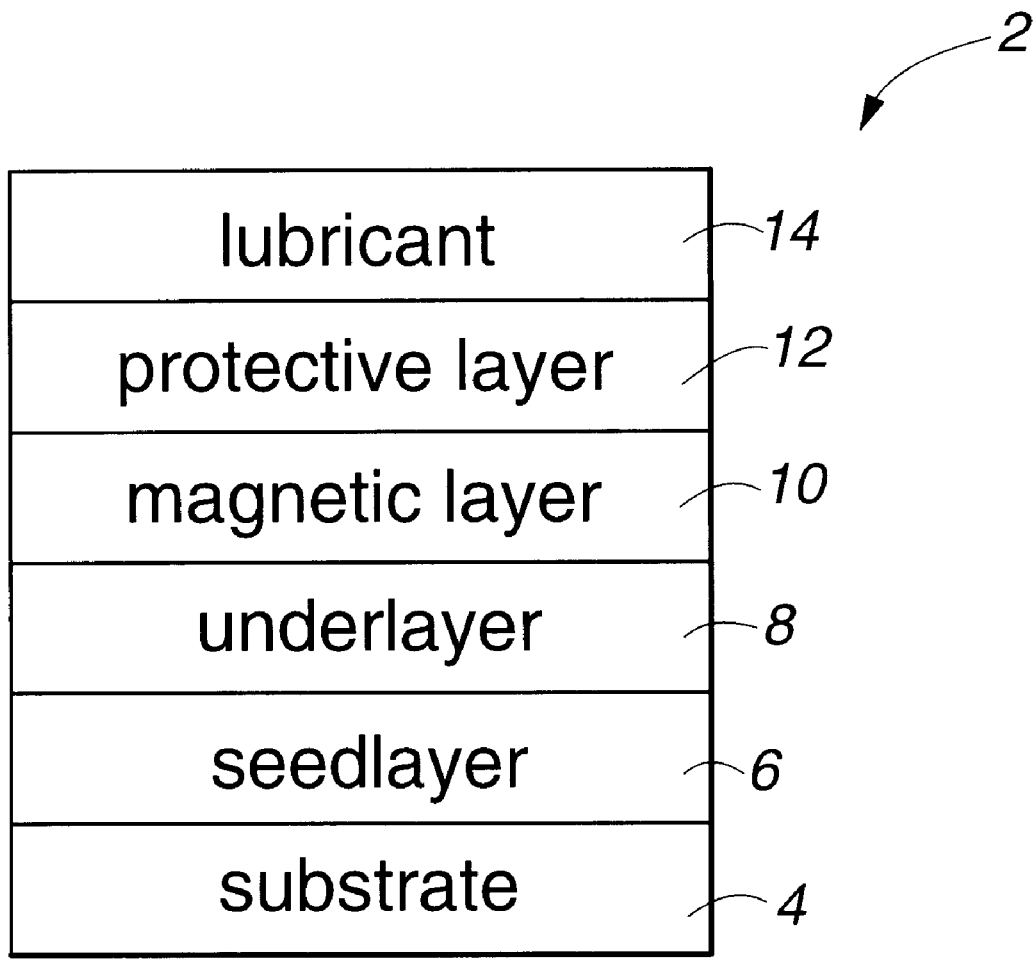
FIG. 1 is a schematic view of a recording media made according to the invention.

Recording medium 2, shown schematically in FIG. 1, includes a substrate 4, commonly made of nickel phosphorus (NiP) or ceramic glass, with a seedlayer 6, comprising an aluminum-containing intermetallic nitride, supported by the substrate. Seedlayer 6 is preferably about 1 to 200 nm thick. A non-magnetic underlayer 8, typically of chromium (Cr) or a chromium alloy (CrX), covers seedlayer 6. A magnetic layer 10, commonly a cobalt-based alloy, is deposited over underlayer 8 with a protective layer 12, typically made of sputtered carbon, as an overcoat. Finally, an organic lubricant 14 can be applied on top of protective layer 12. With the exception of the particular composition of seedlayer 6, the composition of and method for making recording medium 2 can be conventional using conventional deposition techniques and equipment.

General requirements for high density recording include the following:

Signal To Noise: i.e., SNR, so/nm, as high as possible.

Pulse Width: i.e., pw50, narrower is better under normal scaling.

Coercivity: higher is better to resist demagnetization.

Noise: i.e., am, the lower the better—factors with the SNR, so/nm.

Signal: i.e., LFTAA, the higher the better—factors with the SNR, so/nm.

The use of seedlayers is known. However, the present invention is directed to use of a seedlayer comprising an aluminum-containing intermetallic nitride which provides substantial advantages, which are demonstrated by the three examples following.

Figure 2A:
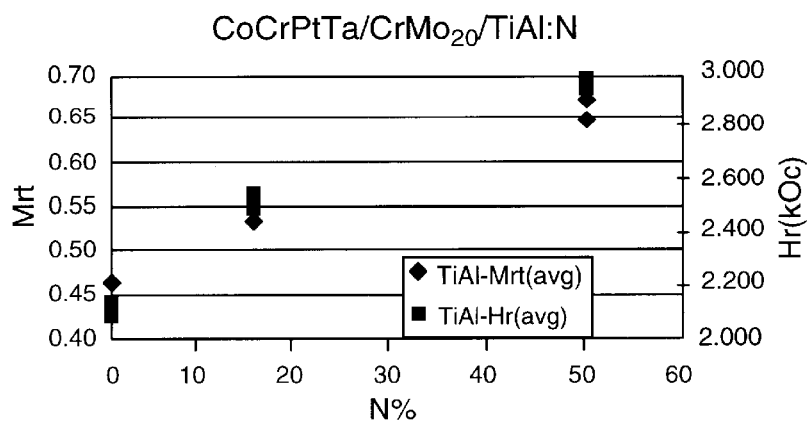
FIG. 2A plots the variation in remanent magnetization and coercivity for a TiAl:N intermetallic nitride seedlayer at 0%, 15% and 50% nitrogen.

The first example relates to use of a titanium aluminum nitride (TiAl:N) seedlayer as discussed with reference to FIGS. 2A–2C. FIG. 2A plots the percentage of nitrogen versus remanent magnetization (Mrt), which is a measure proportional to the signal strength from the disk, and coercivity (Hr(kOc)), a measure of the field strength required to reverse the magnetization orientation on the magnetic media. It is seen that as the percentage of nitrogen increases from 0 through 50%, remanent magnetization increases from about 0.45 to about 0.65 with the same thickness of the medium. (The percentages indicated are all in atomic percentages, that is on an atom by atom basis, not weight.) Thus, the signal strength is increased while the noise, which is proportional to the thickness, can remain substantially constant. The linear density should scale to the first order with coercivity.

Figure 2B:
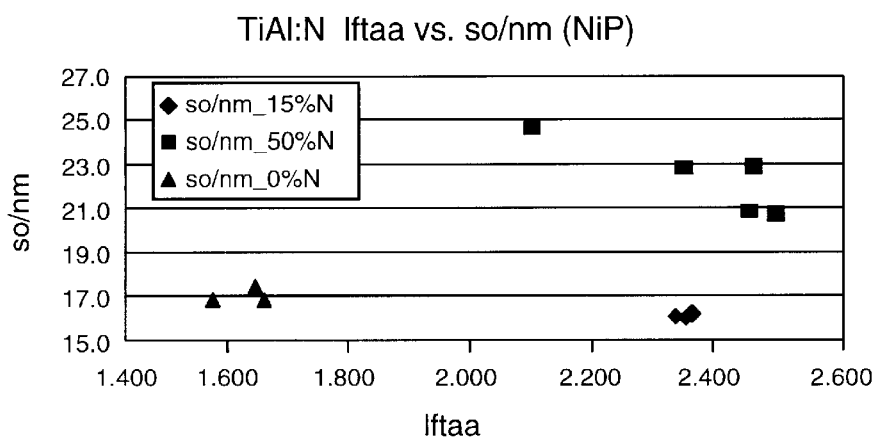
FIG. 2B plots a first measurement of signal to noise (so/nm) ratio versus voltage (lftaa) for a TiAl:N seedlayer at 0%, 15% and 50% nitrogen.

FIG. 2B plots voltage (lftaa) versus a first measure of signal to noise ratio (so/nm). As can be seen from FIG. 2B, increasing the percentage of nitrogen from 0% to 15% causes the signal to noise ratio to remain about the same but increases the output voltage substantially which is advantageous in recording channel design. Increasing the percentage of nitrogen to 50% not only increases the signal to noise ratio from about 17 to an average of about 22 or 23, but also increases the voltage output substantially as well.

Figure 2C:
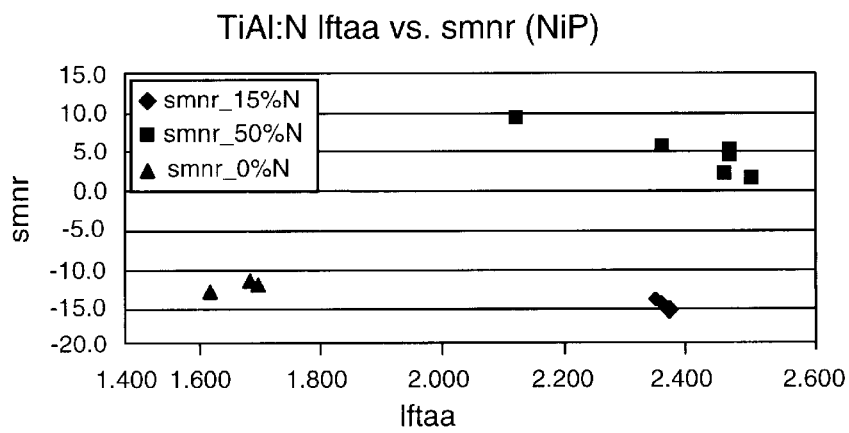
FIG. 2C plots a second signal to noise ratio measurement (smnr) versus voltage (lftaa) for a TiAl:N seedlayer.

FIG. 2C is a plot of a second method for measuring signal to noise ratio, that is the signal to media noise ratio (smnr), versus voltage (lftaa). The results using this measure of signal to noise ratio is substantially similar to that found in FIG. 2B.

Figure 3A:
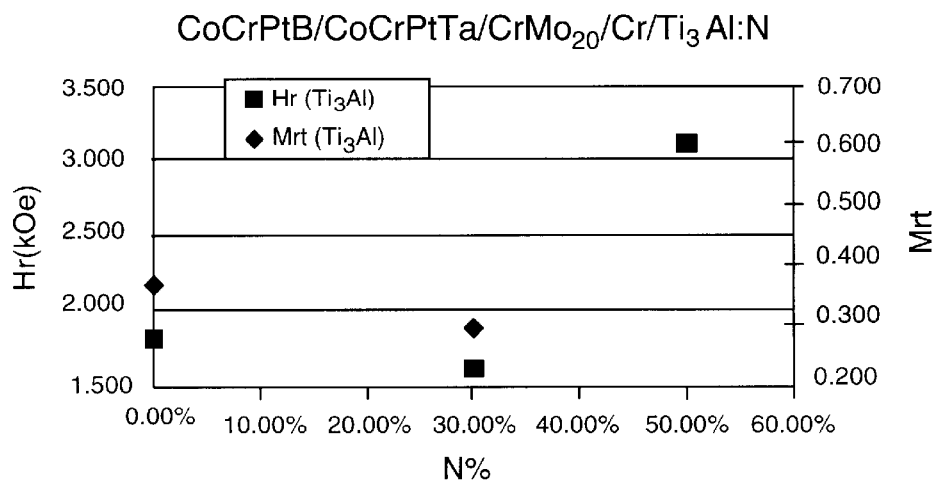
FIG. 3A is a plot similar to that of FIG. 2A but for a $Ti_3Al$:N seedlayer at 0%, 30% and 50% nitrogen.
Figure 3B:
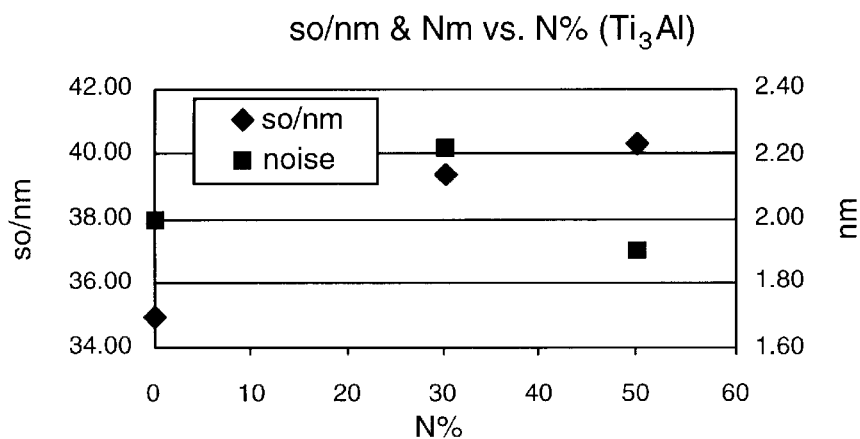
FIG. 3B plots the signal to noise ratio measurement of FIG. 2B (so/nm) versus percent nitrogen and also plots noise (run) versus nitrogen for a $Ti_3Al$:N seedlayer for 0%, 30% and 50% nitrogen.
Figure 3C:
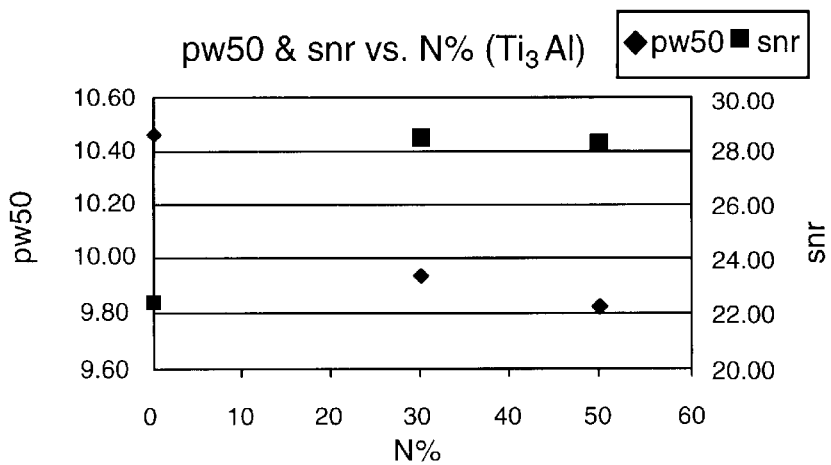
FIG. 3C plots a third measurement of signal to noise ratio (snr) versus nitrogen and signal pulse width (pw50) versus nitrogen for a $Ti_3Al$:N seedlayer at 0, 30% and 50% nitrogen.

FIGS. 3A–3C illustrate plots of test results resulting from a seedlayer comprising a $Ti_3Al:N$ intermetallic nitride seedlayer. FIG. 3A corresponds to FIG. 2A and shows a substantial increase for both magnetic remanence and coercivity when the percentage of nitrogen is 50% as opposed to 0 and 30%. FIG. 3B plots not only the first measure of signal to noise ratio (so/nm) but also noise (nm) versus percent nitrogen. A substantial increase of signal to noise ratio is seen with the increase in percent nitrogen even though noise remains about the same. FIG. 3C plots a third measure of signal to noise ratio (snr) versus percent nitrogen as well as pulse width (pw50) versus percent nitrogen. It is seen that this signal to noise ratio (snr) improves from about 22 to about 28 as the percentage of nitrogen goes from 0% to 50%. Pulse width (pw50) decreases from 10.4 μin to about 9.8 μin as the percentage of nitrogen goes from 0 to 30% and 50% which indicates the possibility of a higher linear density.

Figure 4A:
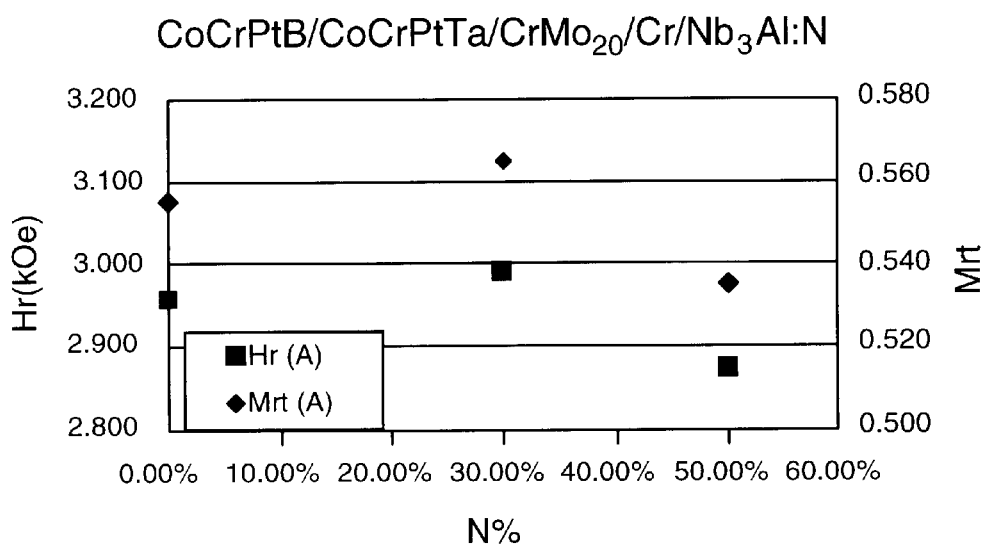
FIG. 4A is a plot similar to FIG. 3A but for an $Nb_3Al$:N seedlayer.
Figure 4B:
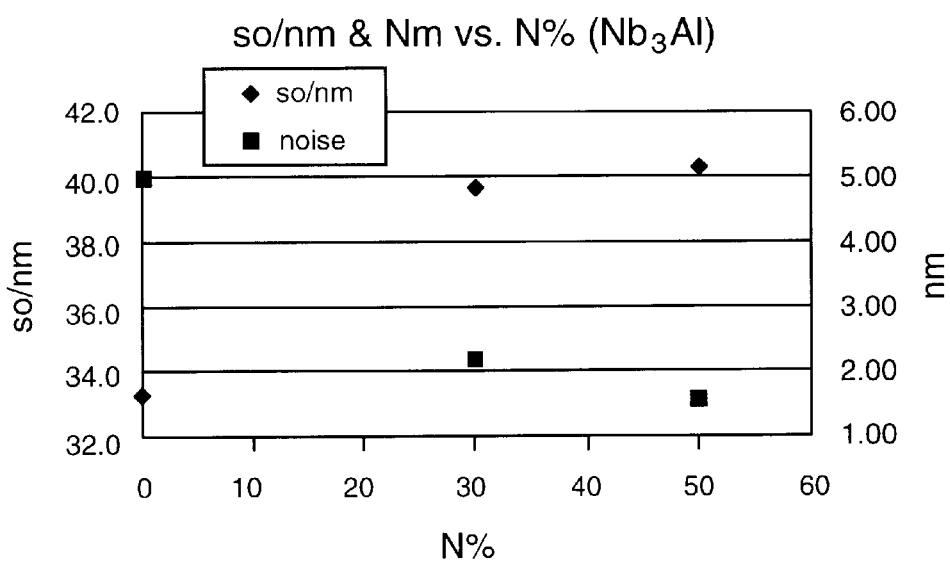
FIG. 4B is a plot similar to FIG. 3B but for an $Nb_3Al$:N seedlayer.

In a third example $Nb_3Al:N$ has been used as an aluminum-containing intermetallic nitride seedlayer 6. FIG. 4A corresponds to FIG. 2A. It can be seen for this composition that the remanent magnetization and coercivity do not vary much with the presence of nitrogen. However, FIG. 4B indicates a substantial improvement in signal to noise ratio from about 32 to about 40 and a substantial decrease in the noise from about 5 to about 1.5 as the percentage of nitrogen is increased from 0 to 50%. Thus, the use of this aluminum-containing intermetallic nitride also provides substantial improvements for the user.

While experimental data have been collected for the three above mentioned aluminum-containing intermetallic nitrides, it is expected that other intermetallic alloys, including CrAl, CuAl, SiAl, TiAl, NiAl, and FeAl, would also be useful in preparing an aluminum-containing intermetallic nitride seedlayer according to the invention.

Modification and variations can be made to the disclosed embodiments without departing from the subject of the invention as defined in the following claims.

What is claimed is:

1. A magnetic recording medium comprising:
   a substrate composed of nickel phosphorous or glass;
   a seedlayer composed of an aluminum-containing intermetallic nitride supported by and in contact with the substrate, wherein the intermetallic nitride comprises an aluminum-containing intermetallic alloy;
   a non-magnetic underlayer composed of chromium or a chromium alloy supported by and in contact with the seedlayer; and
   a magnetic layer supported by the underlayer.

2. The magnetic recording medium according to claim 1 wherein the intermetallic nitride comprises at least one of the following aluminum-containing intermetallic alloys: $Ti_3Al$, $Nb_3Al$, CrAl, CuAl, SiAl, TiAl, NiAl, and FeAl.

3. The magnetic recording medium according to claim 1 wherein the intermetallic nitride comprises at least one of the following aluninum-containing intermetallic alloys: $Ti_3Al$, $Nb_3Al$, CrAl, CuAl, SiAl, and TiAl.

4. The magnetic recording medium according to claim 1 wherein the intermetallic nitride comprises at least one of the following aluminum-containing intermetallic alloys: TiAl, $Ti_3Al$, and $Nb_3Al$.

5. The magnetic recording medium according to claim 1 wherein the seedlayer has a thickness of about 1–200 nm.

6. The magnetic recording medium according to claim 1 wherein the magnetic layer contacts the underlayer.

7. The magnetic recording medium according to claim 6 further comprising a protective layer covering the magnetic layer and a lubricant layer covering the protective layer.

8. A method for making a magnetic recording medium comprising:
   depositing a seedlayer, comprising an aluminum-containing intermetallic nitride, on and in contact with a substrate, wherein the intermetallic nitride comprises an aluminum-containing intermetallic alloy, and the substrate is nickel phosphorous or glass;
   depositing a non-magnetic underlayer on and in contact with the seedlayer, wherein the underlayer is chromium or a chromium alloy; and
   depositing a magnetic layer over the underlayer.

9. The method according to claim 8 wherein depositing the seedlayer is carried out by sputtering with the intermetallic nitride comprising at least one of the following aluminum-containing intermetallic alloys: $Ti_3Al$, $Nb_3Al$, CrAl, CuAl, SiAl, and TiAl.

10. The method according to claim 8 wherein depositing the seedlayer is carried out by sputtering with the intermetallic nitride comprising at least one of the following aluminum-containing intermetallic alloys: TiAl, $Ti_3Al$, and $Nb_3Al$.

11. A method for making a magnetic recording medium comprising:
   depositing a seedlayer, comprising an aluminum-containing intermetallic nitride, on a substrate, wherein the intermetallic nitride comprises an aluminum-containing intermetallic alloy, depositing the seedlayer is carried out by sputtering with the intermetallic nitride comprising at least one of the following aluminum-containing intermetallic alloys: $Ti_3Al$, $Nb_3Al$, CrAl, CuAl, SiAl, and TiAl, and depositing the seedlayer is carried out by reactively sputtering the aluminum-containing intermetallic alloy in an atmosphere comprising argon and nitrogen;

depositing a non-magnetic underlayer over the seedlayer; and depositing a magnetic layer over the underlayer.

12. The method according to claim 11 wherein depositing the seedlayer is carried out with an argon:nitrogen ratio of about 1:10 to 1:1.

13. A method for making a magnetic recording medium comprising:

depositing a seedlayer, comprising an aluminum-containing intermetallic nitride, on a substrate, wherein the intermetallic nitride comprises an aluminum-containing intermetallic alloy, depositing the seedlayer is carried out by sputtering with the intermetallic nitride comprising at least one of the following aluminum-containing intermetallic alloys: $Ti_3Al$, $Nb_3Al$, CrAl, CuAl, SiAl, and TiAl, and depositing the seedlayer is carried out using a sputtering target, comprising nitrogen plus at least one of the aluminum-containing intermetallic alloys, in an argon atmosphere;

depositing a non-magnetic underlayer over the seedlayer; and depositing a magnetic layer over the underlayer.

14. The method according to claim 13 wherein depositing the seedlayer is carried out with the target containing about 1 to 50% atomic nitrogen.

15. A method for making a magnetic recording medium comprising:

depositing a seedlayer, comprising an aluminum-containing intermetallic nitride, on a substrate, the intermetallic nitride comprising at least one of the following aluminum-containing intermetallic alloys: TiAl, $Ti_3Al$, and $Nb_3Al$, wherein if the intermetallic nitride comprises TiAl:N then the intermetallic nitride contains 15 to 50% atomic nitrogen;

depositing a non-magnetic underlayer over the seedlayer; and depositing a magnetic layer over the underlayer.

16. A method for making a magnetic recording medium comprising:

depositing a seedlayer, comprising an aluminum-containing intermetallic nitride, on a substrate, wherein the intermetallic nitride is TiAl:N and contains 15 to 50% atomic nitrogen;

depositing a non-magnetic underlayer over the seedlayer; and depositing a magnetic layer over the underlayer.

17. The method according to claim 16 wherein the intermetallic nitride contains 30 to 50% atomic nitrogen.

18. The method according to claim 16 wherein the intermetallic nitride contains 50% atomic nitrogen.

19. The method according to claim 16 wherein the seedlayer consists of the intermetallic nitride.

20. The method according to claim 19 wherein the substrate is nickel phosphorus.

21. The method according to claim 19 wherein the substrate is glass.

22. The method according to claim 19 wherein the seedlayer contacts the underlayer.

23. The method according to claim 22 wherein the underlayer is chromium or a chromium alloy.

24. The method according to claim 23 wherein the magnetic layer is a cobalt-based alloy.

25. The method according to claim 19 wherein the seedlayer contacts the substrate and the underlayer, the substrate is nickel phosphorus or glass, the underlayer is chromium or a chromium alloy, and the magnetic layer is a cobalt-based alloy.

26. A method for making a magnetic recording medium comprising:

depositing a seedlayer, comprising an aluminum-containing intermetallic nitride, on a substrate, wherein the intermetallic nitride is $Ti_3Al$:N;

depositing a non-magnetic underlayer over the seedlayer; and depositing a magnetic layer over the underlayer.

27. The method according to claim 26 wherein the intermetallic nitride contains 30 to 50% atomic nitrogen.

28. The method according to claim 26 wherein the intermetallic nitride contains 50% atomic nitrogen.

29. The method according to claim 26 wherein the seedlayer consists of the intermetallic nitride.

30. The method according to claim 29 wherein the substrate is nickel phosphorus.

31. The method according to claim 29 wherein the substrate is glass.

32. The method according to claim 29 wherein the seedlayer contacts the underlayer.

33. The method according to claim 32 wherein the underlayer is chromium or a chromium alloy.

34. The method according to claim 33 wherein the magnetic layer is a cobalt-based alloy.

35. The method according to claim 29 wherein the seedlayer contacts the substrate and the underlayer, the substrate is nickel phosphorus or glass, the underlayer is chromium or a chromium alloy, and the magnetic layer is a cobalt-based alloy.

36. A method for making a magnetic recording medium comprising:

depositing a seedlayer, comprising an aluminum-containing intermetallic nitride, on a substrate, wherein the intermetallic nitride is $Nb_3Al$:N;

depositing a non-magnetic underlayer over the seedlayer; and depositing a magnetic layer over the underlayer.

37. The method according to claim 36 wherein the intermetallic nitride contains 30 to 50% atomic nitrogen.

38. The method according to claim 36 wherein the intermetallic nitride contains 50% atomic nitrogen.

39. The method according to claim 36 wherein the seedlayer consists of the intermetallic nitride.

40. The method according to claim 39 wherein the substrate is nickel phosphorus.

41. The method according to claim 39 wherein the substrate is glass.

42. The method according to claim 39 wherein the seedlayer contacts the underlayer.

43. The method according to claim 42 wherein the underlayer is chromium or a chromium alloy.

44. The method according to claim 43 wherein the magnetic layer is a cobalt-based alloy.

45. The method according to claim 39 wherein the seedlayer contacts the substrate and the underlayer, the substrate is nickel phosphorus or glass, the underlayer is chromium or a chromium alloy, and the magnetic layer is a cobalt-based alloy.

* * * * *